(12) United States Patent
Azuhata

(10) Patent No.: US 6,585,023 B2
(45) Date of Patent: Jul. 1, 2003

(54) TAPE APPLICATION APPARATUS

(75) Inventor: Kazuhiro Azuhata, Toyota (JP)

(73) Assignee: Lintec Corporation, Tokyo (JP)

( * ) Notice: Subject to any disclaimer, the term of this patent is extended or adjusted under 35 U.S.C. 154(b) by 0 days.

(21) Appl. No.: 09/994,630

(22) Filed: Nov. 28, 2001

(65) Prior Publication Data

US 2002/0062929 A1 May 30, 2002

(30) Foreign Application Priority Data

Nov. 30, 2000 (JP) ........................................ 2000-365788

(51) Int. Cl.$^7$ ................................................ B32B 31/00
(52) U.S. Cl. .......................... 156/574; 156/71; 156/579
(58) Field of Search .......................... 156/71, 574, 577, 156/579

(56) References Cited

U.S. PATENT DOCUMENTS 5,820,725 A * 10/1998 Maeda et al. ............... 156/391

FOREIGN PATENT DOCUMENTS

| JP | 51-135015 | 11/1976 | |
| JP | 62-046780 | 2/1987 | |
| JP | 2-221582 | 9/1990 | |
| JP | 3-166068 | 7/1991 | |
| JP | 5-065298 | 3/1993 | |
| JP | 5-338627 | 12/1993 | |
| JP | 11-147658 | * 6/1999 | |
| JP | 2000-159165 | 6/2000 | |
| JP | 2001-123127 | * 5/2001 | |
| WO | WO 01/25077 | * 4/2001 | |

* cited by examiner

Primary Examiner—Mark A. Osele
(74) Attorney, Agent, or Firm—Finnegan, Henderson, Farabow, Garrett & Dunner LLP

(57) ABSTRACT

A tape application apparatus comprises a pair of first guide rollers provided on a main frame, biasing means for biasing a sub-frame mounted movably on the main frame to the side of the first guide rollers, a pair of second guide rollers mounted on the sub-frame so as to face the first guide rollers for holding the frame movably along a tape application plane incorporation with the first guide rollers, a pressure roller mounted on the main frame in the state where an adhesive tape is wound and is pressed against the tape application plane, a tape guide plate in which a base end thereof is mounted rotatably on the main frame, and tape guide plate holding means for holding the tape guide plate so as to form a gap for guiding an adhesive tape with release liner incorporation with the pressure roller.

14 Claims, 7 Drawing Sheets

TAPE APPLICATION APPARATUS

This application is based on Patent Application No. 2000-365788 filed Nov. 30, 2000 in Japan, the content of which is incorporated hereinto by reference.

BACKGROUND OF THE INVENTION

1. Field of the Invention

The present invention relates to a tape application apparatus for applying an adhesive tape with a strip form along a tape application surface formed on a work, with peeling off from a release liner.

2. Description of the Related Art

It is desirable in view of restraining reflection of light from a window frame (door sash) formed on a door panel of an automotive vehicle when viewed from the outside of the vehicle, particularly from the side of a vehicle body and hence securely obtaining a clear-cut view of the entire vehicle body to color with frosted black the inside and the outside of the window frame.

For this purpose, it has been conventionally performed to perform spray painting of frosted black paint on the window frame. However, spray painting encounters various problems as requiring investment for additional facility for maintaining work environment good enough, taking a long period for drying paint, and so forth. As a solution for such drawback, Japanese Patent Application Laid-open No. 51-135015 (1976) or Japanese Patent Application Laid-open No. 62-46780 (1987) proposes application of frosted black adhesive tape having high weather resistance and high wear resistance on the window frame, in place. In such case, as is well known, since the most part of the window frame of the automotive vehicle is consisted of three-dimensional curved portion, the above-mentioned adhesive tape application apparatus inherently becomes large scale. Also, when such adhesive tape application apparatus is installed in a practical production line, an investment for production line becomes huge. In addition, it has poor flexibility in adapting to modification of design of the window frame, and has poor general-purpose properties.

Although it can be considered that the operation for application of the adhesive tape is performed manually by the worker without using any device, in order to accurately perform applying operation at a speed adapted to the production line of the automotive vehicle, quite high skill is required.

Thus, there has been proposed in Japanese Patent Application Laid-open No. 5-338627 (1993), a tape application device which can easily and quickly perform application of the adhesive tape without requiring high skill of the worker. By employing the tape application device, the adhesive tape can be accurately applied at a predetermined position of the window frame easily and quickly without requiring high skill of the worker. In addition, apparatus for automatically assembling a weather strip onto the door sash, such as those disclosed in Japanese Patent Application Laid-open Nos. 2-221582 (1990), 3-166068 (1991) or Japanese Patent Application Publication No. 5-65298 (1993), are applicable.

However, the tape application apparatus of the prior art disclosed in Japanese Patent Application Laid-open No. 5-338627 (1993) suffers from difficulties that it has a complicated structure with many movable parts to result in the high manufacturing cost, and further that it is fundamentally difficult to adapt the apparatus to a vertical window frame which has different widths up and down because it is premised on the use of a predetermined width tape. With respect to this difficulty a tape application apparatus disclosed in Japanese Patent Application Laid-open No. 2000-159165 is for a vertical window frame having its width different at upper and lower portions continuously, in which although accurate application work is likely, workability should be improved. These tape application apparatuses lack also generality for varieties of works having different widths, and require a tape application apparatus corresponding to any one work every time.

Further, when the weather strip mounting apparatus disclosed in Japanese Patent Application Laid-open Nos. 2-221582, 3-166068 or Japanese Patent Application Publication No.5-65298 is applied for the tape application device, a space becomes necessary for installation of a manipulator in addition for spaces required for holding a door panel and a positioning device. Then, the manufacturing line cannot be adapted for further requirement of the space unless modifying the manufacturing line of the vehicle.

SUMMARY OF THE INVENTION

It is an object of the present invention to provide a tape application apparatus capable of accurately applying an adhesive tape on the surfaces of a plurality of works each having different sizes of the widths of tape application surfaces and on the surface of a vertical window frame of a door panel having the size of a width thereof that continuously increases and decreases longitudinally easily and rapidly even by workers skilled in the art.

A tape application apparatus according to the present invention, which is mounted removably on a work for applying an adhesive tape peeled off from release liner to a tape application surface formed on the work, comprises:

a main frame;

a pair of first guide rollers mounted rotatably around an axis in parallel to a first direction with respect to the main frame;

a sub-frame mounted movably with respect to the main frame along a second direction in perpendicular to a plane involving an axis of the first guide rollers;

biasing means for biasing the sub-frame to the side of the first guide rollers;

a pair of second guide rollers mounted rotatably around the axis in parallel to the first direction with respect to the sub-frame so as to face the first guide rollers for movably holding the main frame and the sub-frame along the tape application surface;

a pressure roller mounted rotatably on the main frame around an axis in parallel to the second direction, and being rotatable in the state where the adhesive tape is wound therearound and pressed against the tape application surface;

a tape guide plate with a base end mounted rotatably with respect to the main frame around an axis in perpendicular to the first direction; and tape guide plate holding means capable of holding a rotating position of the tape guide plate with respect to the main frame such that a gap is formed for guiding the adhesive tape with release liner with the tape guide plate and the pressure roller.

In accordance with the present invention, a tip end of the adhesive tape is peeled off from the release liner and is then applied on the tape application surface of the work at an application starting position on the work. The sub-frame is operated against biasing force by biasing means to push the tape application apparatus against the work at a predetermined position of the same in the state where an interval between the first and second guide rollers is extended, whereby operation force against the sub-frame is released to engage the first guide rollers and the second guide rollers at the predetermined position on the work with the biasing means. In this state, restraint of a tape guide plate by the tape guide plate holding means is released to open the tape guide plate and hence wind the adhesive tape with release liner on the pressure roller, and the tip end of the release liner is taken out to a front side in the application direction of the adhesive tape with respect to the tape application surface. Successively, the tape guide plate is operated to hold the adhesive tape with release liner in a gap between it and the pressure roller and hold this rotating position of the tape guide plate with the tape guide plate holding means.

Thereafter, the main frame is moved along the tape application surface while being guided with the first and second guide rollers. Therefore, the adhesive tape peeled off from the release liner is pressed against the tape application surface by the pressure roller and is applied on the tape application surface. Simultaneously, the release liner is derived to the front side of the adhesive tape along the direction of the application of the adhesive tape.

In accordance with the tape application apparatus of the present invention, on the tape application surfaces of various works having different sizes of the widths the adhesive tapes corresponding to thereto are successfully applied easily and accurately.

The tape application apparatus according to the present invention may further comprise:

- a roller holder mounted rotatably around an axis in perpendicular to the first direction and being rotatable to a working position and an escape position;
- a roller shaft mounted on the roller holder at a base end thereof and having an axis in parallel to the second direction at the working position of the roller holder; and
- roller shaft holding means capable of holding the tip end of the roller shaft at the working position, the pressure roller being mounted rotatably on the roller shaft. In this case, winding operation for the adhesive tape with release liner on the pressure roller is achieved very easily.

It is possible to further comprise holding means for holding the roller holder at the escape position. The holding means may be one utilizing magnetic force, whereby a mechanism of the tape application apparatus is simplified. The roller holder may be rotatable around an axis in parallel to a third direction also in perpendicular to the second direction.

The tape application apparatus may be further comprised a stopper for restraining the movement of the sub-frame toward the side of the first guide rollers against the biasing force of the biasing means. In this case, it is possible to restrain the operation to the sub-frame to the minimum upon the tape application apparatus being mounted on the work to improve workability.

It may be allowed at the work starting position for the work to further comprise a hook for temporarily hooking the main frame on an upper end of the work. In this situation, it is securely possible to hold the tape application apparatus at the work starting position for the work even though the biasing force by the biasing means is not increased, and it is further possible to reduce the operation force upon the tape application apparatus being moved along the tape application surface.

The base end of the tape guide plate may be rotatable around the axis in parallel to the third direction also in perpendicular to the second direction.

The base end of the tape guide plate may be mounted on the one end side of the main frame extending along the second direction, and the roller holder may be mounted on the other end side of the main frame extending along the second direction.

The tape guide plate holding means may utilize a magnetic force. In this case, it is possible to simplify the mechanism of the tape application apparatus.

The sub-frame may include a lug for displacing the sub-frame such that the sub-frame is separated from the first guide rollers against the biasing force by the biasing means. In this situation, it is possible to easily achieve the operation for the sub-frame upon the tape application apparatus being engaged with the work.

A surface involving axes of the second guide rollers may be inclined with respect to a surface involving axes of the first guide rollers such that an interval between the first guide rollers and the second guide rollers disposed on one side in a third direction extending perpendicularly to the first and second directions becomes wider than an interval between the first guide rollers and the second guide rollers disposed on the other side. In this case, it is possible to apply, even on the work having the tape application surface having its width size that is continuously increased and decreased, the corresponding adhesive tape easily and accurately.

The first guide roller and the second guide roller are preferably disposed along the third direction, on one side of the third direction from the pressure roller. In this case, even on the work having the tape application surface, whose width size is continuously increased, for example even on the surface of a door panel of a vehicle where the tape application surface is the surface of the longitudinal window frame it is possible to smoothly pass the adhesive tape with release liner to the tape application surface, and hence it is possible to apply the adhesive tape to the longitudinal window frame easily and accurately even by persons not skilled in the art.

Then, the work is the door panel of the vehicle, and the tape application surface may be the surface of the longitudinal window frame of the door panel.

The above and other objects, effects, features and advantages of the present invention will become more apparent from the following description of embodiments thereof taken in conjunction with the accompanying drawings.

DETAILED DESCRIPTION OF PREFERRED EMBODIMENTS

There will be described in detail a preferred embodiment of the present invention wherein a tape application apparatus of the present invention is applied to a longitudinal window frame of a front door of a passenger car with reference to FIGS. 1 to 7. However, the present invention is not limited to those embodiments and is applicable to the longitudinal window frame of the rear door panel and also applicable to techniques of other fields that include like difficulties.

Figure 1:
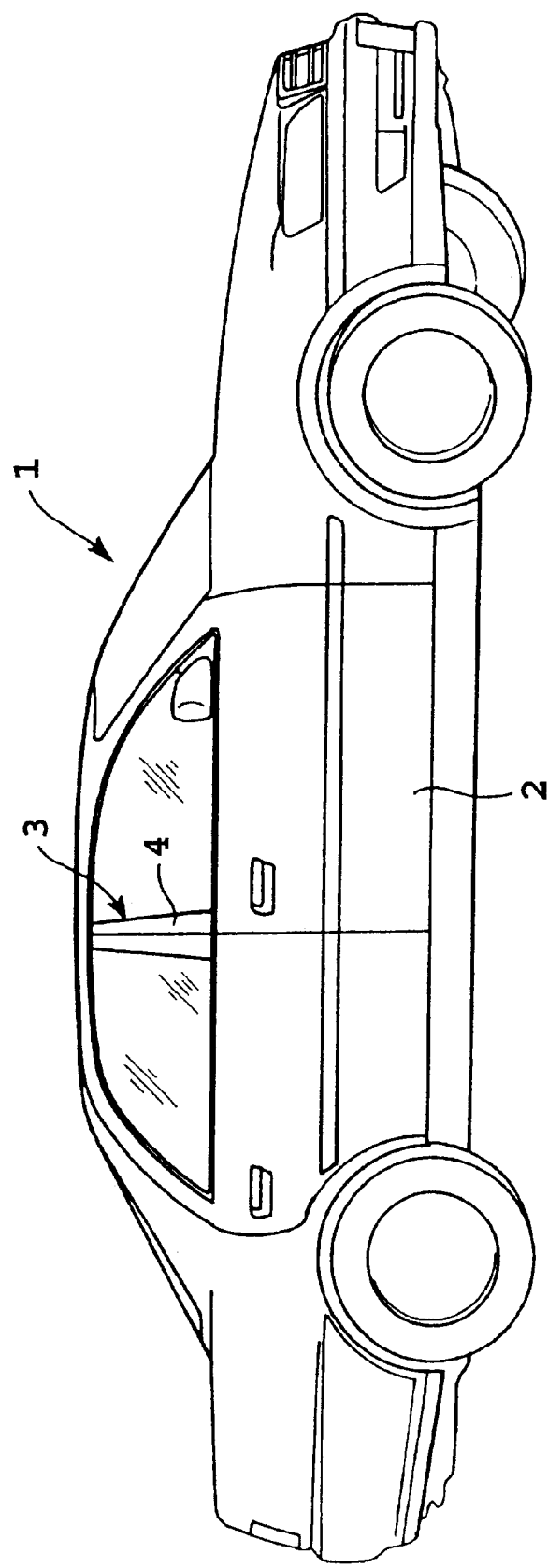
FIG. 1 is a perspective view illustrating an external appearance of a vehicle that is a work of the present invention.

Referring now to FIG. 1, in which an external appearance of the passenger car that is a work of the present invention is illustrated, the longitudinal window frame 3 of the front door panel 2 of the vehicle 1 that is the work is tapered, widened in the width size of a tape application surface 4 of the longitudinal window frame as it goes to a lower end side in the present embodiment. For this, an adhesive tape Ta (refer to FIG. 7) applied on the tape application surface 4 is also tapered, having a size and configuration corresponding to the tape application surface 4.

Figure 2:
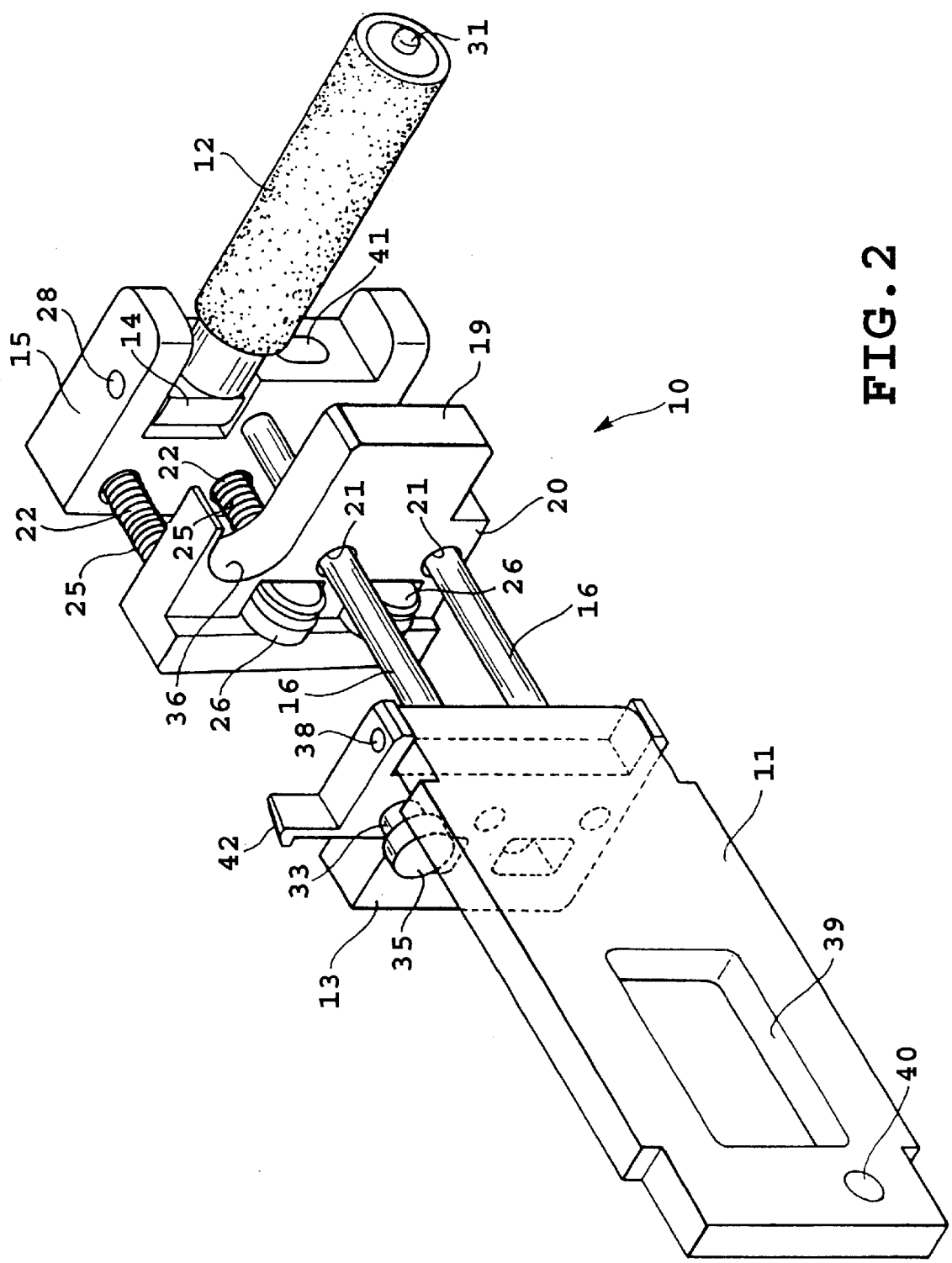
FIG. 2 is a perspective view illustrating an external appearance of one preferred embodiment of a tape application apparatus according to the present invention for use in the vehicle illustrated in FIG. 1.
Figure 3:
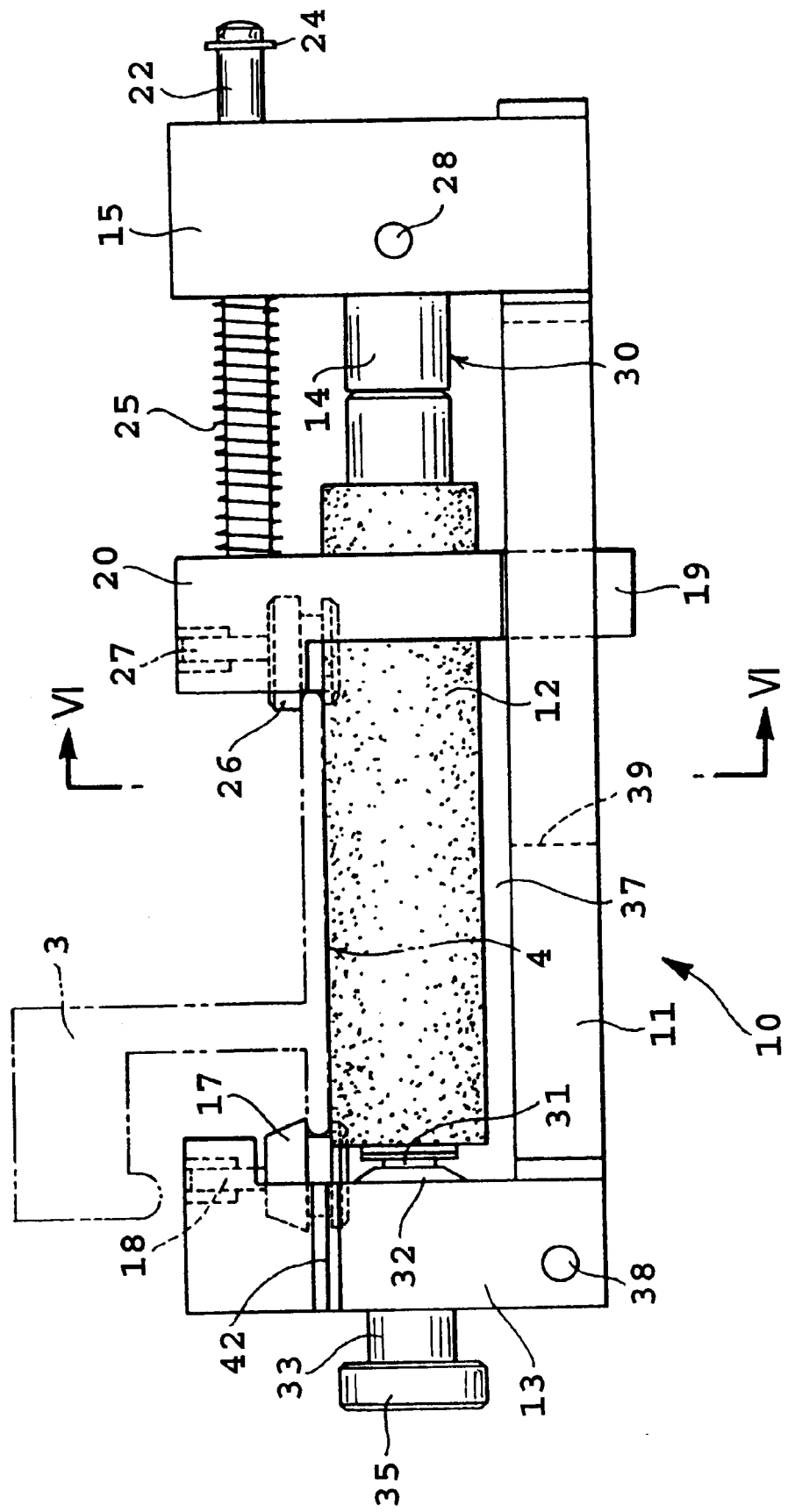
FIG. 3 is a plan view illustrating an external appearance of the embodiment illustrated in FIG. 2.
Figure 4:
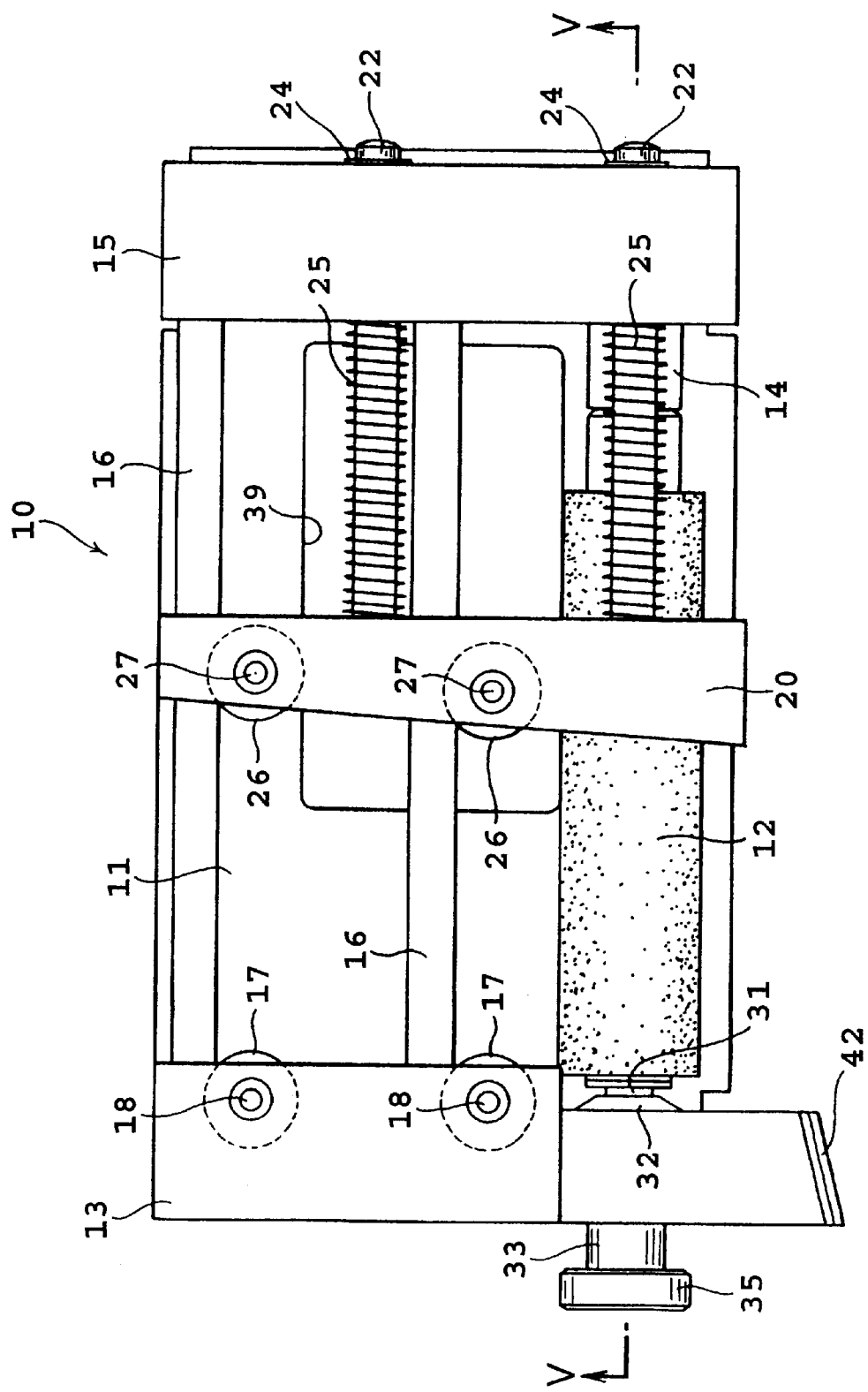
FIG. 4 is a view of a rear surface that represents the external appearance of the embodiment illustrated in FIG. 2.
Figure 5:
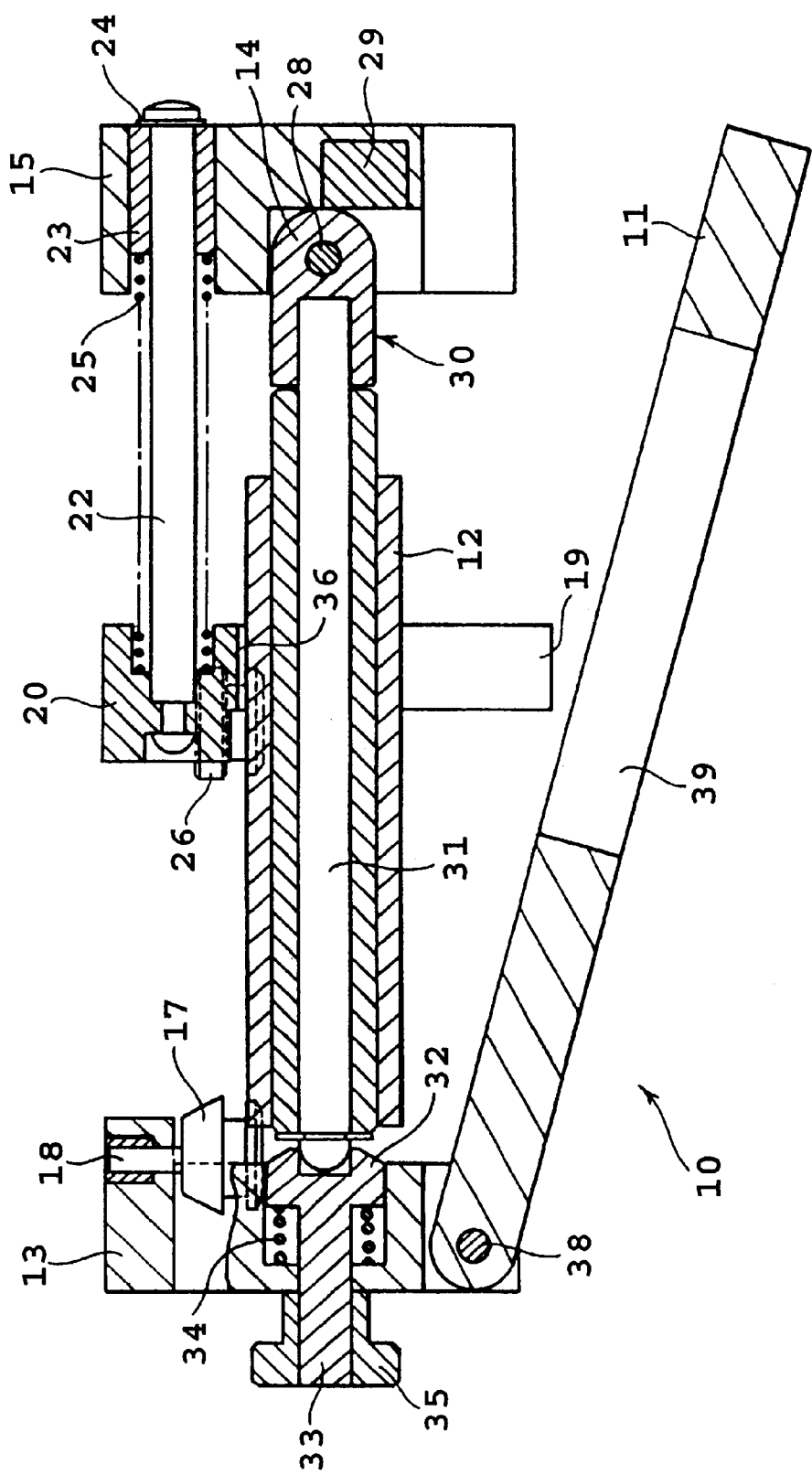
FIG. 5 is a cross-sectional view taken along a line V—V in FIG. 4, where a tape guide plate is opened.
Figure 6:
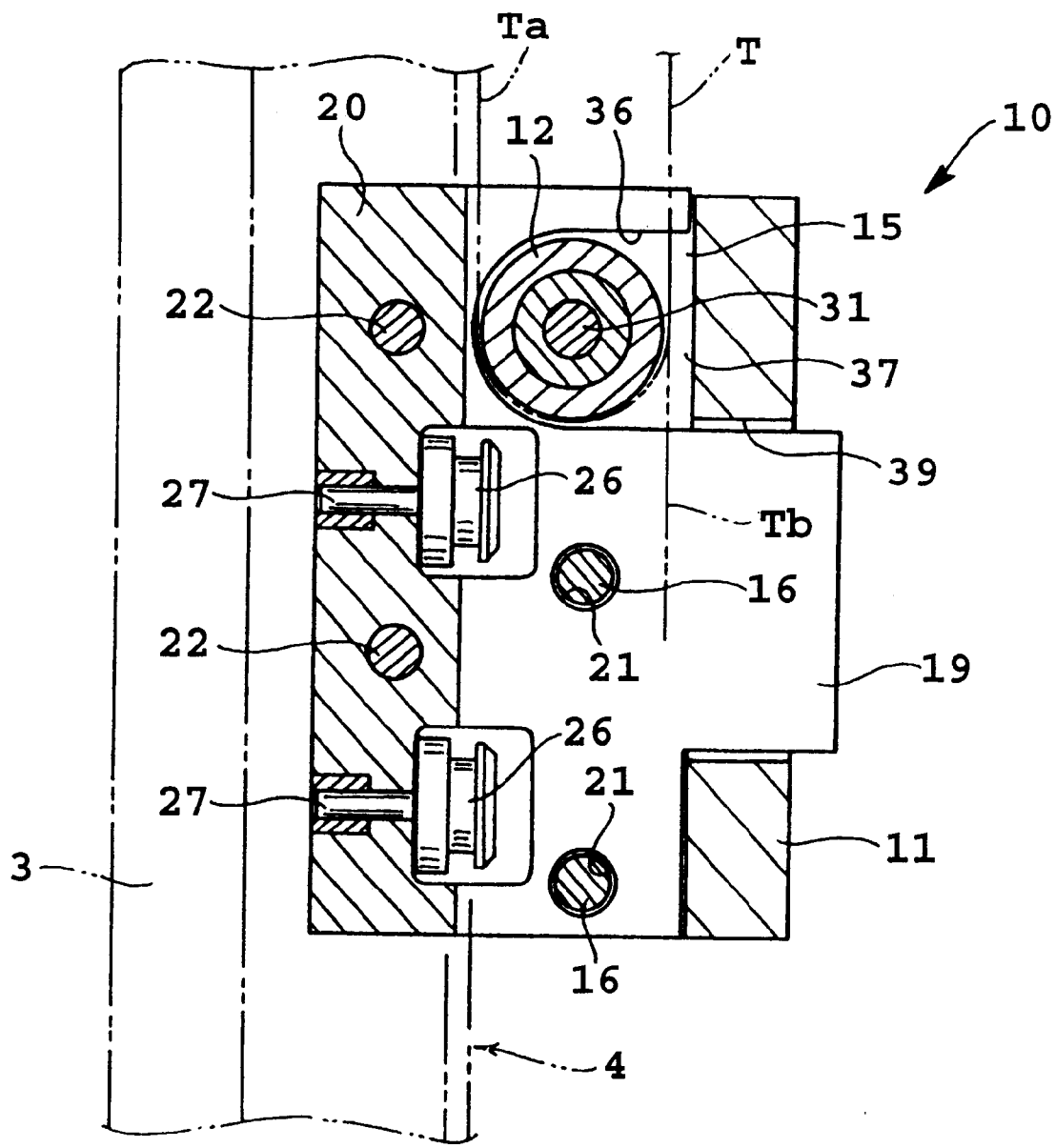
FIG. 6 is a cross-sectional view taken along a line VI—VI in FIG. 3.

Referring then to FIG. 2, an external appearance of the tape application apparatus 10, in the present embodiment, mounted on the longitudinal window frame 3 of the front panel 2 of the aforementioned vehicle is illustrated, in which there is further illustrated a tape guide plate 11 opened and a pressure roller 12 held at an escape position. Referring further to FIGS. 3 and 4, there are illustrated an upper surface configuration and a rear surface configuration, respectively. Referring to FIGS. 5 and 6, there are illustrated a cross-sectional configuration taken along a line V—V in FIG. 4, in which there is further illustrated the tape guide plate 11 opened, and a cross-sectional configuration taken along a line VI—VI in FIG. 3, respectively. A first block 13 on which a base end of the tape guide plate 11 described later is mounted and a second block 15 on which a roller holder 14 described later is mounted are round rod shaped, respectively, and are coupled integrally with opposite ends of two coupling rods 16 that extend in parallel to each other. These members, i.e. first block 13, second block 15, and coupling rods 16 constitute a main frame of the present invention. In the present invention, when the tape application apparatus 10 is mounted on the vertical window frame 3 of the front door panel 2, intervals between the tape application surface 4 and the two coupling rods 16 become equal to each other. In other words, the tape application surface 4 and a plane involving axial lines of the two coupling rods 16 are set to be parallel.

A pair of the first guide rollers 17, outer peripheral surfaces of which engage rotatably with the one side end edge of the vertical window frame 3, are mounted on the first block 13 of the main frame, separated from each other in parallel with respect to the opposite directions of the two coupling rods 16. Each support shafts 18 of the pair of the first guide rollers 17 are anchored to the first block 13 such that an axis of the support shaft is parallel with respect to the first direction (vertical direction in FIG. 3), i.e., perpendicular to a flat plane involving each axes of the aforementioned two coupling rods 16.

A sub-frame 20 having a grip 19 is disposed between the first block 13 and the second block 15 of the main frame. The two coupling rods 16 penetrate freely through a through-hole 21 formed in the sub-frame 20. The two guide rods 22 that extend in parallel with the coupling rods 16 are provided, protruding to the side of the second block 15. A pair of bearing bushes 23 is incorporated in the second block 15 for guiding the guide rods 22 slidably. The sub-frame 20 is movable along a second direction (left and right directions in FIG. 4) in perpendicular to a plane involving each axes of the first guide rollers 17 with the aid of the guide rods 22 guided slidably to a bearing bush 23. On tip ends of the two guide rods 22 that penetrate the second block 15 of the main frame stopper 24 is mounted to prevent the guide rods 22 from slipping out from the bearing bush 23.

A pair of compression coil springs 25 as biasing means according to the present invention are interposed between the second block 15 of the main frame and the sub-frame 20. The two guide rods 22 penetrate these compression springs 25. In the state where operation force is not applied to the sub-frame 20 is biased to the side of the first guide rollers 17, i.e., to the side of the first block 13 with the aid of spring force of the springs 25 to permit the stoppers 24 to push the second block 15.

In the present embodiment, a movement of the sub-frame 20 is achieved by the two guide rods 22. However, it is also possible to omit these guide rods 22 and guide the movement of the sub-frame 20 by making use of the aforementioned coupling rods 16. In this case, the coupling rods 16 may be changed to a stepped shaft instead of the aforementioned stopper 24, with which stepped shaft a displacement of the sub-frame 20 to the side of the first block 13 may be restrained. Otherwise, a snap ring may be mounted on the coupling rod 16 as a stopper. Each bearing bushes which the coupling rods 16 penetrate may be mounted on the sub-frame 20. The same function as the aforementioned embodiment is ensured by mounting the compression coiled springs as the biasing means on a part of the coupling rods 16 between the second block 15 of the main frame and the sub-frame 20. If the sub-frame 20 could be biased to the side of the first guide rollers 17, then another biasing means might be adopted as a matter of course instead of the compression coiled springs 25.

On the sub-frame 20, a pair of second guide rollers 26 are mounted rotatably around an axis extending in parallel to the first direction, the second guide rollers 26 facing the pair of the first guide rollers 17 and being engaged rollably with the other side end edge of the vertical window frame 3 in its outer peripheral surface. The second guide rollers 26 serve to guide a smooth movement of the tape application apparatus 10 along the tape application surface 4 of the vertical window frame 3 together with the first guide rollers 17. In the present embodiment, an interval between the first guide roller 17 and the second guide roller 26 disposed on one side of a third direction (upper and lower direction in FIG. 4) in perpendicular to the first direction and the second direction on one side (lower side in FIG. 4) of the third direction is set wider than that between the first guide roller 17 and the second guide roller 26 disposed on the other side (upper side in FIG. 4) such that a plane involving each axes of the support shafts 27 of the second guide rollers 26 is inclined with respect to a plane involving each axes of the first guide rollers 17 corresponding to an inclination of the tapered side end edge of the vertical window frame 3. Therefore, all the first and second guide rollers 17, 26 can be engaged with the side end edge of the vertical window frame 3.

A rotatable roller holder 14 is rotatably mounted on the second block 15 of the main frame at a working position illustrated in FIG. 3 and at an escape position illustrated in FIG. 2 through a support pin 28 having an axis extending in a third direction perpendicularly to the first and second directions. For holding the roller holder 14 at the escape position, in the present embodiment the roller holder 14 itself is constructed with a ferromagnetic substance, and a permanent magnet 29 capable of abutment with the surface of the roller holder 14 located at the escape position is embedded in the second block 15. An end surface 30 of the roller holder 14 that abuts the permanent magnet 29 at the escape position is parallel with respect to a plane involving an axis of the support pin 28. The permanent magnet 29 and the end surface of the roller holder 14 serve as the holding mean of the present invention. The holding means according to the present invention is however not limited to the present embodiment provided that the roller holder 14 could be held at its escape position.

The roller holder 14 may be anchored to the second block 15 such that the axis of the support pin 28 lies along the second direction, i.e., in parallel with each axes of the coupling rods 16.

On the roller holder 14, there is mounted a base end of the roller shaft 31 having an axis parallel to the second direction at the working position of the roller holder 14. On the roller shaft 31, there is mounted rotatably the pressure roller 12 capable of rolling in the state where the pressure roller is pressed against the tape application surface 4 of the vertical window frame 3. An outer periphery of the pressure roller 12 is formed with a rubber like elastic structure such as foam resin.

For holding the pressure roller 12 at the working position, there is mounted movably along the second direction the operation rod 33 including a cup section 32 which is formed on the tip end side and is capable of receiving the tip end of the roller shaft 31 formed on the tip end side of the operation rod 33. Between the cup section 32 of the operation rod 33 and the first block 13, there is incorporated a compression coil spring 34 for biasing the cup section 32 to the side of the sub-frame 20. A lug 35 for returning the operation rod 33 into the first block 13 against the spring force of the compression spring 34 is mounted in a united manner on the base end thereof that penetrates the first block 13. The operation rod 33 on which the cup section 32 is formed and the spring 34 and the like serve as the roller shaft holding means of the present invention which is capable of holding the tip end of the roller shaft 31 at the working position. The roller shaft holding means according to the present invention is however not limited thereto provided that the tip end of the roller shaft 31 could be held at the working position.

In the present embodiment, the tip end of the roller shaft 31 is formed into a hemispherical configuration and the outer peripheral surface of the cup section 32 is formed into a conical configuration. Therefore, when the roller shaft 31 is changed over from the side of the escape position to the working position, the cup section 32 is pushed back into the first block 13 against the spring force of the spring 34 without the returning operation for the cup section 32 into the first block 13 by holding the lug 35, and hence the tip end of the roller shaft 31 is automatically contained in the cup section 32 and the rotation axis of the pressure roller 12 is held in parallel to the second direction.

When the pressure roller 12 is at the working position, the pressure roller 12 is disposed striding the sub-frame 20, so that a flank relief section 36 is formed on the sub-frame 20 to avoid an interference to the pressure roller 12. The first guide roller 17 and the second guide roller 26 are disposed along the third direction on the one side of the same (lower side in FIG. 4) with respect to the pressure roller 12 at the working position. Therefore, the interval between the first guide roller 17 and the second guide roller 26 is likely to be wider than the width of the adhesive tape Ta actually applied by the pressure roller 12, so that there can be previously prevented inconvenience that opposite side edges of the adhesive tape Ta in the width direction interfere with the first block 13 of the main frame and the sub-frame 20 and hence are folded.

There is rotatably mounted around the axis of the support pin 38 extending along the third direction in perpendicular to the first and second directions the base end of the tape guide plate 11 that forms a gap 37 for guiding the adhesive tape with release liner T with the pressure roller 12 located at the working position and the first block 13 of the main frame. At the center of the tape guide plate 11, there is formed an opening 39 for operating the grip 19 of the sub-frame 20 in the state where the tape guide plate 12 is closed as illustrated in FIG. 3. The grip 19 of the sub-frame 20 is protruded from the opening 39.

In order to keep the tape guide plate 11 closed, in the present embodiment a permanent magnet 40 is embedded in the tip end of the tape guide plate 11, and there is embedded in the second block 15 of the main frame a catching plate 41 formed with a ferromagnetic substance abutting the permanent magnet 40 when the tape guide plate 11 is closed. The permanent magnet 40 and the catching plate 41 serve as the tape guide plate holding means by the present invention. For the tape guide plate holding means according to the present invention, a rotating position of the tape guide plate 11 with respect to the main frame may be kept so as to form the gap 37 for guiding the adhesive tape with release liner T with the aid of the tape guide plate 11 and the pressure roller 12.

In the present embodiment, the axis of the support pin 38 is set in parallel to the third direction. However, the tape guide plate 11 may be anchored with a pin rotatably to the first block 13 and the second block 15 of the main frame such that the axis of the support pin 38 is parallel to the second direction, i.e., to the longitudinal direction of the coupling rod 16. In the present embodiment, there is formed on the first block 13 of the main frame a hook 42 for temporarily hooking the tape application apparatus 10 on an upper end of the front door panel 2 at a starting position of the tape application work on the vertical window frame 3. Therefore, the tape application apparatus 10 is previously prevented from slipping down owing to the self-weight thereof.

Upon actual application work using the tape application apparatus 10 according to the present embodiment, the second block 15 of the main frame and the grip 19 of sub-frame 20 are first grasped to extend the interval between the first guide roller 17 and the second guide roller 26 to press the tape application apparatus 10 against the upper end of the vertical window frame 3, and the first guide rollers 17 and the second guide rollers 26 are held between the opposite side end edges of the tape application surface 4 at the upper end of the vertical window frame 3 with the aid of the spring force of the compression spring 25 by releasing an operator's hold from the grip 19. Hereupon, the hook 42 is hooked on an upper end of the front door panel 2 to prevent the tape application apparatus 10 from slipping down from the vertical window frame 3. Successively, the tape guide plate 11 is opened while the lug 35 of the operation rod 33 is pulled out, whereby the tip end of the roller shaft 31 is put out of the lug 35 and hence the pressure roller 12 is rotated to the escape position from the working position as illustrated in FIG. 2.

Referring herein to FIG. 6, the tip end of the adhesive tape Ta in the adhesive tape with release liner T is peeled off from the tip end of the release liner Tb, and is applied at the application starting position of the flat tape application surface 4 of the vertical window frame 3, i.e., on the upper end of the vertical window frame 3 from an upper portion of the tape application apparatus 10. Further, the tip end of the release liner Tb is guided from an upper to lower portion of the two coupling rods 16 located between the first block 13 of the main frame and the sub-frame 20, and a remaining adhesive tape with release liner T is also guided from the upper to lower portion of the two coupling rods 16 such that it overlaps the tip end of the release liner Tb, and thereafter the pressure roller 12 is rotated from the escape position to its working position such that the tip end of the roller shaft 31 is fitted to the cup 32 of the operation rod 33. Therefore, the tip end of the adhesive tape Ta is put between the tape application surface 4 and the pressure roller 12, and hence the adhesive tape Ta is pressed against the tape application surface 4 with the aid of the pressure roller 12.

Successively, only the adhesive tape with release liner T is wound around the pressure roller 12 to be pulled up, and the tape guide plate 11 is closed, whereby the adhesive tape with release liner T is interposed in the gap 37 between the pressure roller 12 and the tape guide plate 11, and the tip end of the release liner Tb from which the tip end of the adhesive tape Ta is removed is interposed between the coupling rods 16 and the tape guide plate 11.

Figure 7:
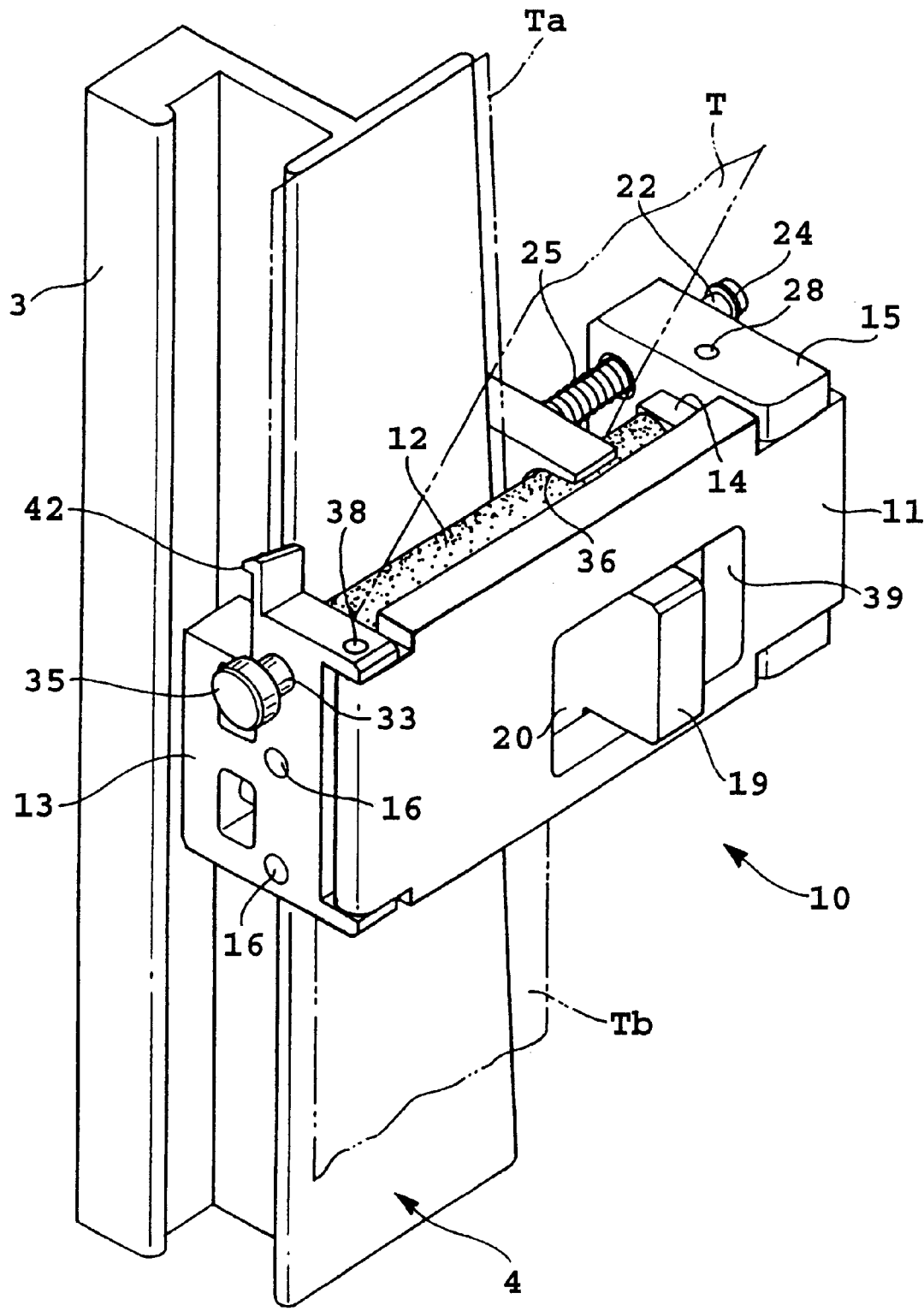
FIG. 7 is a working view that represents the state of tape application work for use in the tape application apparatus of the embodiment illustrated in FIG. 2.

Thereafter, the hook 42 is detached from the upper end of the front door panel 2, and the tape application apparatus 10 is moved downward along the tape application surface 4 while pulling the adhesive tape with release liner T upward, whereby the adhesive tape Ta is peeled off from the adhesive tape with release liner T and is applied on the tape application surface 4 by the pressure roller 12. Simultaneously, the release liner Tb is derived downward from between the coupling rod 16 and the tape guide plate 11, as illustrated in FIG. 7.

The tape application apparatus 10 engages without any backlash following the opposite side end edges of the tape application surface 4 of the vertical window frame 3 with the first guide rollers 17 and the second guide rollers 26. The sub-frame 20 is displaced to the side of the second block 15 following an increase of the width size of the tape application surface 4 for assurance of the applying operation without causing any trouble.

In such a manner, the adhesive tape Ta is applied on the tape application surface 4 of the vertical window frame 3, and thereafter the tape application apparatus 10 is detached from the lower end of the vertical window frame 3. In succession, a squeeze device (not shown) is used to squeeze the lateral opposite ends of the adhesive tape Ta on opposite side edges of the tape application surface 4. The adhesive tape Ta has been already positioned with respect to the tape application surface 4 in this situation, the squeezing work is achieved without causing any problem.

In the aforementioned embodiment, the tapered one, in which the width size of the tape application surface 4 continuously changes. The present invention is however applicable to even for works each having a predetermined width size tape application surface. Herein, all intervals between the first guide roller 17 and the second guide roller 26 opposing mutually may be equally set. Therefore, even tape application surfaces each having a different width size in various works are dealt with by making use of one tape application apparatus.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A tape application apparatus mounted removably on a work for applying an adhesive tape peeled off from release liner to a tape application surface formed on the work, the apparatus comprising:

a main frame;

a pair of first guide rollers mounted rotatably around an axis in parallel to a first direction with respect to the main frame;

a sub-frame mounted movably with respect to said main frame along a second direction in perpendicular to a plane involving an axis of the first guide roller;

biasing means for biasing the sub-frame to one side of said first guide rollers;

a pair of second guide rollers mounted rotatably around the axis in parallel to the first direction with respect to said sub-frame so as to face said first guide rollers for movably holding said main frame and said sub-frame along the tape application surface;

a pressure roller mounted rotatably on said main frame around an axis in parallel to the second direction, and being rotatable in the state where the adhesive tape is wound therearound and pressed against the tape application surface;

a tape guide plate with a base end mounted rotatably with respect to said main frame around an axis in perpendicular to the first direction; and tape guide plate holding means capable of holding a rotating position of said tape guide plate with respect to said main frame such that a gap is formed for guiding the adhesive tape with release liner with said tape guide plate and said pressure roller.

2. A tape application apparatus according to claim 1, further comprising:

a roller holder mounted rotatably around an axis in perpendicular to the first direction and being rotatable to a working position and an escape position;

a roller shaft mounted on said roller holder at a base end thereof and having an axis in parallel to the second direction at the working position of said roller holder; and roller shaft holding means capable of holding the tip end of said roller shaft at the working position, said pressure roller being mounted rotatably on said roller shaft.

3. A tape application apparatus according to claim 2, further comprising a holding means for holding said roller holder at the escape position.

4. A tape application apparatus according to claim 3, wherein said holding means utilizes magnetic force.

5. A tape application apparatus according to claim 2, wherein said roller holder is rotatable around an axis in parallel to a third direction also in perpendicular to the second direction.

6. A tape application apparatus according to claim 1 or 2, further comprising a stopper for restraining the movement of said sub-frame toward the side of said first guide rollers against the biasing force of said biasing means.

7. A tape application apparatus according to claim 1 or 2, further comprising a hook for temporarily hooking said main frame on an upper end of a work at the work starting position for the work.

8. A tape application apparatus according to claim 1 or 2, wherein the base end of said tape guide plate is rotatable around the axis in parallel to the third direction also in perpendicular to the second direction.

9. A tape application apparatus according to claim 1 or 2, wherein the base end of said tape guide plate is mounted on the one end side of said main frame extending along the second direction, and said roller holder is mounted on the other end side of said main frame extending along the second direction.

10. A tape application apparatus according to claim 1 or 2, wherein said tape guide plate holding means utilizes magnetic force.

11. A tape application apparatus according to claim 1 or 2, wherein said sub-frame includes a lug for displacing said sub-frame such that it is separated from said first guide rollers against the biasing force by said biasing means.

12. A tape application apparatus according to claim 1 or 2, wherein a plane involving an axis of said second guide roller is inclined with respect to a plane involving the axis of said first guide roller such that a gap between said first guide roller and said second guide roller both disposed along a third direction in perpendicular to the first and second directions on the one side of the third direction is wider than an interval between said first guide roller and said second guide roller both disposed on the other side of the same.

13. A tape application apparatus according to claim 12, wherein said first guide roller and said second guide roller are disposed along the third direction on the one side of the same, compared with said pressure roller.

14. A tape application apparatus according to claim 1 or 2, wherein the work is a door panel of a vehicle, and the tape application surface is a surface of a vertical window frame of the door panel.

* * * * *